US012563573B2

(12) United States Patent
Zhou et al.

(10) Patent No.: US 12,563,573 B2
(45) Date of Patent: Feb. 24, 2026

(54) BEAM FAILURE DETECTION RESOURCE SET FOR PHYSICAL DOWNLINK CONTROL CHANNEL (PDCCH) WITH REPETITION

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 342 days.

(21) Appl. No.: 18/007,454

(22) PCT Filed: Sep. 24, 2020

(86) PCT No.: PCT/CN2020/117426
§ 371 (c)(1),
(2) Date: Jan. 30, 2023

(87) PCT Pub. No.: WO2022/061649
PCT Pub. Date: Mar. 31, 2022

(65) Prior Publication Data
US 2023/0337253 A1 Oct. 19, 2023

(51) Int. Cl.
*H04L 5/00* (2006.01)
*H04B 7/06* (2006.01)
(Continued)

(52) U.S. Cl.
CPC ...... *H04W 72/232* (2023.01); *H04B 7/06964* (2023.05); *H04L 5/0051* (2013.01); *H04L 43/0811* (2013.01)

(58) Field of Classification Search
CPC . H04L 5/0051; H04L 5/0053; H04L 43/0811; H04L 5/0023; H04B 7/06964; H04W 72/232
See application file for complete search history.

(56) References Cited

U.S. PATENT DOCUMENTS

| 12,126,560 B1 | 10/2024 | Kwak et al. | |
| 2020/0068416 A1* | 2/2020 | Kang | H04W 48/16 |

(Continued)

FOREIGN PATENT DOCUMENTS

| CN | 110535598 A | 12/2019 |
| CN | 110798900 A | 2/2020 |

(Continued)

OTHER PUBLICATIONS

Huawei, et al., "Summary of Remaining Issues on Beam Failure Recovery", 3GPP TSG RAN WG1 Meeting #92bis, 3GPP Draft, R1-1803637, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, 13 Pages, Apr. 15, 2018, XP051425934, p. 1-3, figure 2, sections 2.1, 3.7.

(Continued)

*Primary Examiner* — Andrew Lee

(74) *Attorney, Agent, or Firm* — Holland & Hart LLP

(57) ABSTRACT

This disclosure provides systems, methods and apparatus, including computer programs encoded on computer storage media, for using a beam failure detection reference signal resource set for a physical downlink control channels (PDCCH) with repetition. In one aspect, a user equipment (UE) may monitor a physical downlink control channel (PDCCH) transmission using at least two transmission control indicator (TCI) states. The UE may determine a beam failure detection reference signal resource set associated with the PDCCH monitoring based at least in part on a characteristic of the one or more of the TCI states or a list (Continued)

Monitor a PDCCH transmission using at least two transmission control indicator (TCI) states — 505

Identify a characteristic of one or more of the at least two TCI states — 510

Determine a first beam failure detection reference signal resource set associated with the PDCCH monitoring using the one or more of the at least two TCI states based on the characteristic of the one or more of the at least two TCI states — 515

Monitor the first beam failure detection reference signal resource set associated with the PDCCH monitoring to identify a beam failure — 520

500 of a pair of reference signals configured based at least in part on one of the at least two TCI states. The UE may monitor the first beam failure detection reference signal resource set associated with the PDCCH monitoring to identify a beam failure.

21 Claims, 7 Drawing Sheets

(51) Int. Cl.
_H04L 43/0811_ (2022.01)
_H04W 72/232_ (2023.01)

(56) References Cited

U.S. PATENT DOCUMENTS

| | | | | |
|---|---|---|---|---|
| 2020/0229169 | A1 | 7/2020 | John Wilson et al. | |
| 2020/0314664 | A1* | 10/2020 | Zhou | H04B 7/0617 |
| 2020/0314881 | A1* | 10/2020 | Bagheri | H04L 5/0051 |
| 2020/0382354 | A1* | 12/2020 | Sengupta | H04L 5/001 |
| 2021/0321442 | A1* | 10/2021 | Jung | H04L 5/005 |
| 2021/0329575 | A1* | 10/2021 | Li | H04L 5/0048 |
| 2022/0159733 | A1* | 5/2022 | Cirik | H04L 5/0092 |
| 2022/0294514 | A1* | 9/2022 | Kang | H04B 7/06964 |
| 2022/0312449 | A1* | 9/2022 | Sun | H04L 5/0044 |
| 2023/0106244 | A1* | 4/2023 | Yu | H04B 7/0695 |
| | | | | 370/329 |
| 2023/0180242 | A1* | 6/2023 | Cirik | H04L 5/0023 |
| | | | | 370/329 |

FOREIGN PATENT DOCUMENTS

| | | | |
|---|---|---|---|
| CN | 110958635 | A | 4/2020 |
| CN | 111567081 | A | 8/2020 |
| WO | 2019215389 | A2 | 11/2019 |

OTHER PUBLICATIONS

Huawei, et al., "Remaining Issues on Beam Failure Recovery", 3GPP TSG RAN WG1 Meeting #93, R1-1805953, 3rd Generation Partnership Project, Mobile Competence Centre, 650, Route Des Lucioles, F-06921 Sophia-Antipolis Cedex, France. vol. RAN WG1, No. Busan, Korea, May 21, 2018-May 25, 2018, May 11, 2018, 6 pages, XP051461661, Section 2.

Supplementary Partial European Search Report—EP20954501—Search Authority—Munich—May 24, 2024.

Supplementary European Search Report—EP20954501—Search Authority—Munich—Aug. 14, 2024.

International Search Report and Written Opinion—PCT/CN2020/117426—ISA/EPO—Jun. 24, 2021.

* cited by examiner

Comm.
Manager
160

100

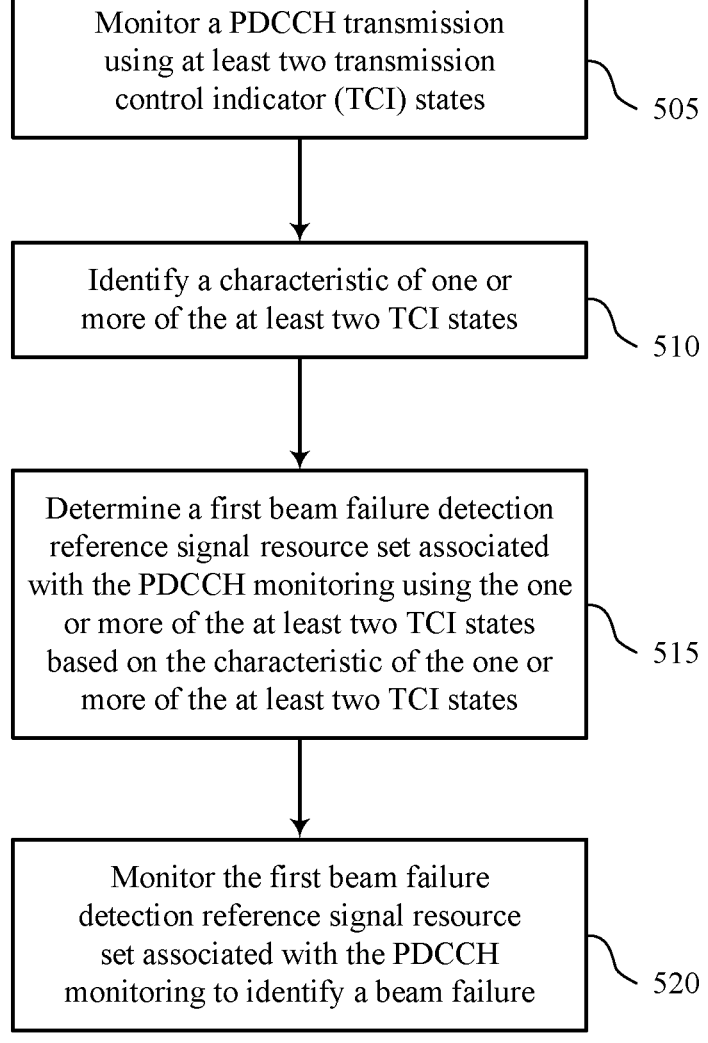

Monitor a PDCCH transmission
using at least two transmission
control indicator (TCI) states

505

Identify a characteristic of one or
more of the at least two TCI states

510

Determine a first beam failure detection
reference signal resource set associated
with the PDCCH monitoring using the one
or more of the at least two TCI states
based on the characteristic of the one or
more of the at least two TCI states

515

Monitor the first beam failure
detection reference signal resource
set associated with the PDCCH
monitoring to identify a beam failure

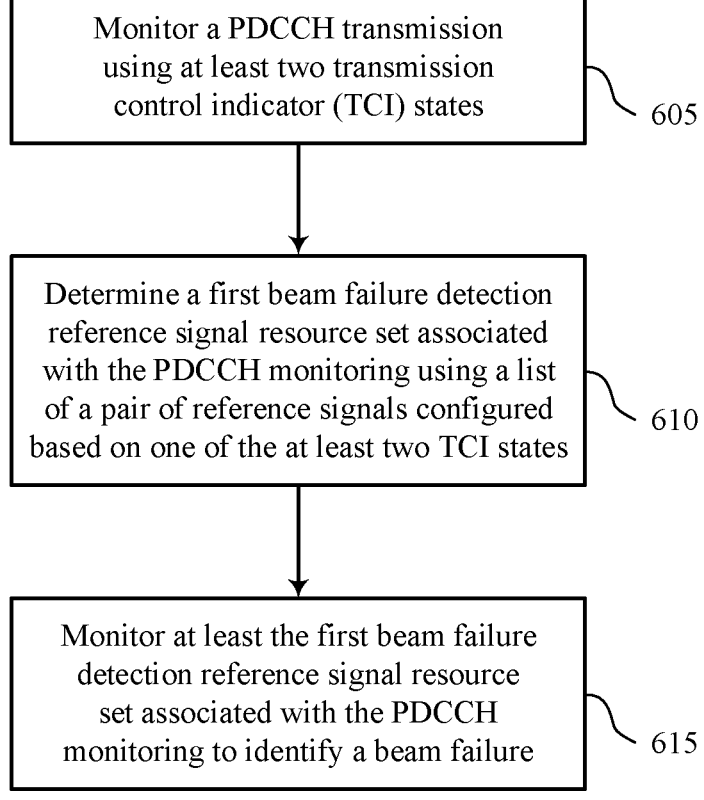

Monitor a PDCCH transmission using at least two transmission control indicator (TCI) states

605

Determine a first beam failure detection reference signal resource set associated with the PDCCH monitoring using a list of a pair of reference signals configured based on one of the at least two TCI states

610

Monitor at least the first beam failure detection reference signal resource set associated with the PDCCH monitoring to identify a beam failure

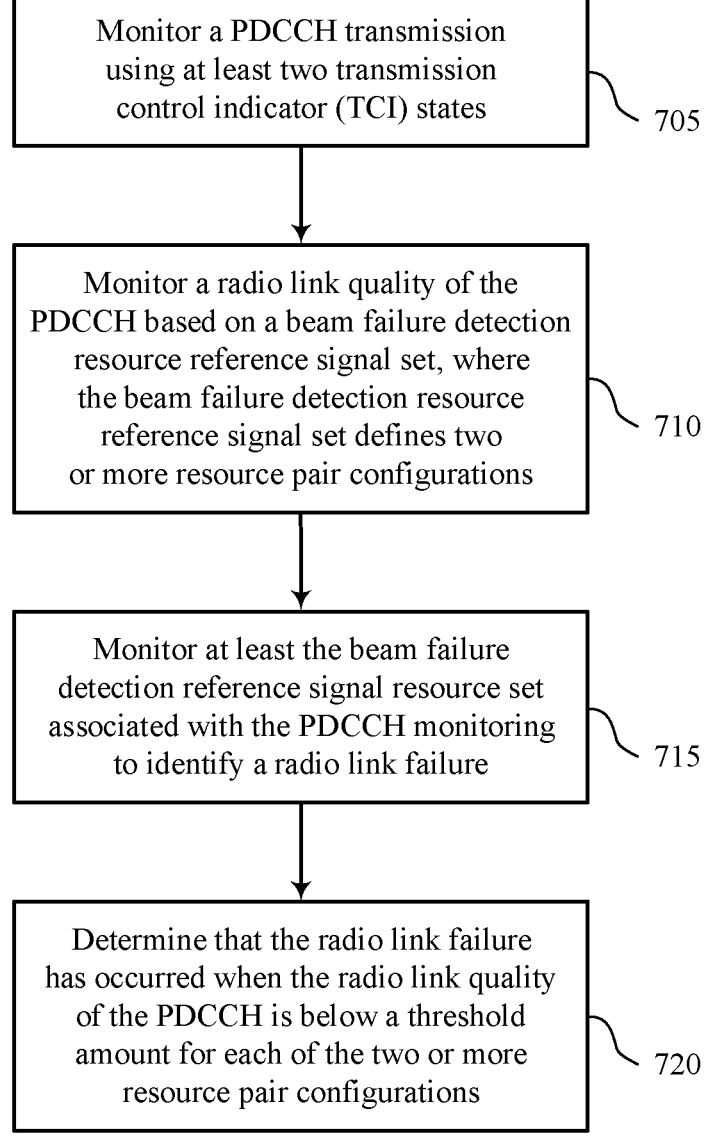

Monitor a PDCCH transmission
using at least two transmission
control indicator (TCI) states
— 705

Monitor a radio link quality of the
PDCCH based on a beam failure detection
resource reference signal set, where
the beam failure detection resource
reference signal set defines two
or more resource pair configurations
— 710

Monitor at least the beam failure
detection reference signal resource set
associated with the PDCCH monitoring
to identify a radio link failure
— 715

Determine that the radio link failure
has occurred when the radio link quality
of the PDCCH is below a threshold
amount for each of the two or more
resource pair configurations
— 720

BEAM FAILURE DETECTION RESOURCE SET FOR PHYSICAL DOWNLINK CONTROL CHANNEL (PDCCH) WITH REPETITION

CROSS REFERENCE

The present Application is a 371 national stage filing of International PCT Application No. PCT/CN2020/117426 by ZHOU et al. entitled "BEAM FAILURE DETECTION RESOURCE SET FOR PHYSICAL DOWNLINK CONTROL CHANNEL (PDCCH) WITH REPETITION," filed Sep. 24, 2020, which is assigned to the assignee hereof, and which is expressly incorporated by reference in its entirety herein.

TECHNICAL FIELD

This description relates to wireless communications, including using a beam failure detection reference signal (RS) resource set for physical downlink control channel (PDCCH) repetition.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at an apparatus of a user equipment (UE). The method may include monitoring a PDCCH transmission using at least two transmission control indicator (TCI) states, identifying a characteristic of one or more of the at least two TCI states, determining a first beam failure detection reference signal resource set associated with the PDCCH monitoring using the one or more of the at least two TCI states based on the characteristic of the one or more of the at least two TCI states, and monitoring the first beam failure detection reference signal resource set associated with the PDCCH monitoring to identify a beam failure.

Another innovative aspect of the subject matter described in this disclosure can be implemented in an apparatus for wireless communications at a UE. The apparatus may include a processing system. The processing system may be configured to monitor a PDCCH transmission using at least two TCI states, identify a characteristic of one or more of the at least two TCI states, determine a first beam failure detection reference signal resource set associated with the PDCCH monitoring using the one or more of the at least two TCI states based on the characteristic of the one or more of the at least two TCI states, and monitor the first beam failure detection reference signal resource set associated with the PDCCH monitoring to identify a beam failure.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to monitor a PDCCH transmission using at least two TCI states, identify a characteristic of one or more of the at least two TCI states, determine a first beam failure detection reference signal resource set associated with the PDCCH monitoring using the one or more of the at least two TCI states based on the characteristic of the one or more of the at least two TCI states, and monitor the first beam failure detection reference signal resource set associated with the PDCCH monitoring to identify a beam failure.

Another innovative aspect of the subject matter described in this disclosure can be implemented in an apparatus for wireless communications at a UE. The apparatus may include means for monitoring a PDCCH transmission using at least two TCI states, identifying a characteristic of one or more of the at least two TCI states, determining a first beam failure detection reference signal resource set associated with the PDCCH monitoring using the one or more of the at least two TCI states based on the characteristic of the one or more of the at least two TCI states, and monitoring the first beam failure detection reference signal resource set associated with the PDCCH monitoring to identify a beam failure.

Another innovative aspect of the subject matter described in this disclosure can be implemented in a non-transitory computer-readable medium storing code for wireless communications at an apparatus of a UE. The code may include instructions executable by a processor to monitor a PDCCH transmission using at least two TCI states, identify a characteristic of one or more of the at least two TCI states, determine a first beam failure detection reference signal resource set associated with the PDCCH monitoring using the one or more of the at least two TCI states based on the characteristic of the one or more of the at least two TCI states, and monitor the first beam failure detection reference signal resource set associated with the PDCCH monitoring to identify a beam failure.

In some implementations of the method, apparatuses, and non-transitory computer-readable medium described herein, the characteristic of the one or more of the at least two TCI states may be an order of the at least two TCI states, and where determining the first beam failure detection reference signal resource set further may include operations, features, means, or instructions for setting the first beam failure detection reference signal resource set to include periodic channel state information reference signal (CSI-RS) resource configuration indexes having values the same as values of reference signal indexes in a reference signal set indicated as a first TCI state by the order of the at least two TCI states.

In some implementations of the method, apparatuses, and non-transitory computer-readable medium described herein, the characteristic of the one or more of the at least two TCI states may be an identification, and where determining the first beam failure detection reference signal resource set further may include operations, features, means, or instructions for selecting a first TCI state of the at least two TCI states based on the identification, and setting the first beam failure detection reference signal resource set to include periodic CSI-RS resource configuration indexes having values the same as values of reference signal indexes in a reference signal set indicated by the first TCI state.

In some implementations of the method, apparatuses, and non-transitory computer-readable medium described herein, the identification includes one of a TCI state identification, a control resource set (CORESET) identification, or a search space identification.

In some implementations of the method, apparatuses, and non-transitory computer-readable medium described herein may further include operations, features, means, or instructions for selecting the first TCI state may be based on a smallest identification of the at least two TCI states.

In some implementations of the method, apparatuses, and non-transitory computer-readable medium described herein may further include operations, features, means, or instructions for determining a second beam failure detection reference signal resource set associated with the PDCCH monitoring.

In some implementations of the method, apparatuses, and non-transitory computer-readable medium described herein, determining the first beam failure detection reference signal resource set further may include operations, features, means, or instructions for setting the first beam failure detection reference signal resource set to include periodic CSI-RS resource configuration indexes having values the same as values of reference signal indexes in a first reference signal set indicated by a first TCI state of the at least two TCI states, and determining the second beam failure detection reference signal resource set further may include operations, features, means, or instructions for setting the second beam failure detection reference signal resource set to include periodic CSI-RS resource configuration indexes having values the same as values of reference signal indexes in a second reference signal set indicated by a second TCI state of the at least two TCI states.

In some implementations of the method, apparatuses, and non-transitory computer-readable medium described herein, determining the first beam failure detection reference signal resource set further may include operations, features, means, or instructions for setting the first beam failure detection reference signal resource set to include periodic CSI-RS resource configuration indexes having values the same as values of reference signal indexes in a first reference signal set indicated by a TCI state of the at least two TCI states associated with a smaller transmit/reception point (TRP) identification, a smaller TCI state identification, a smaller CORESET identification, or a smaller search space identification, and determining the second beam failure detection reference signal resource set further may include operations, features, means, or instructions for setting the second beam failure detection reference signal resource set to include periodic CSI-RS resource configuration indexes having values the same as values of reference signal indexes in a second reference signal set indicated by a second TCI state of the at least two TCI states.

Some implementations of the method, apparatuses, and non-transitory computer-readable medium described herein may further include operations, features, means, or instructions for detecting a radio link failure based on the monitoring at least the first beam failure detection reference signal resource set, and sending an indication of the radio link failure to a base station or a first interface configured to output the indication of the radio link failure for transmission to the base station.

In some implementations of the method, apparatuses, and non-transitory computer-readable medium described herein, monitoring the PDCCH transmission further may include operations, features, means, or instructions for monitoring at least one CORESET associated with the at least two TCI states, monitoring one search space set associated with at least two CORESETs, or monitoring two search space sets associated with two CORESETs each having an active TCI state.

One innovative aspect of the subject matter described in this disclosure can be implemented in a method for wireless communications at an apparatus of a UE. The method may include monitoring a PDCCH transmission using at least two TCI states, determining a first beam failure detection reference signal resource set associated with the PDCCH monitoring using a list of a pair of reference signals configured based on one of the at least two TCI states, and monitoring at least the first beam failure detection reference signal resource set associated with the PDCCH monitoring to identify a beam failure.

Another innovative aspect of the subject matter described in this disclosure can be implemented in an apparatus for wireless communications at a UE. The apparatus may include a processing system configured to monitor a PDCCH transmission using at least two TCI states, determine a first beam failure detection reference signal resource set associated with the PDCCH monitoring using a list of a pair of reference signals configured based on one of the at least two TCI states, and monitor at least the first beam failure detection reference signal resource set associated with the PDCCH monitoring to identify a beam failure.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to monitor a PDCCH transmission using at least two TCI states, determine a first beam failure detection reference signal resource set associated with the PDCCH monitoring using a list of a pair of reference signals configured based on one of the at least two TCI states, and monitor at least the first beam failure detection reference signal resource set associated with the PDCCH monitoring to identify a beam failure.

Another innovative aspect of the subject matter described in this disclosure can be implemented in an apparatus for wireless communications at a UE. The apparatus may include means for monitoring a PDCCH transmission using at least two TCI states, determining a first beam failure detection reference signal resource set associated with the PDCCH monitoring using a list of a pair of reference signals configured based on one of the at least two TCI states, and monitoring at least the first beam failure detection reference signal resource set associated with the PDCCH monitoring to identify a beam failure.

Another innovative aspect of the subject matter described in this disclosure can be implemented in a non-transitory computer-readable medium storing code for wireless communications at an apparatus of a UE. The code may include instructions executable by a processor to monitor a PDCCH transmission using at least two TCI states, determine a first beam failure detection reference signal resource set associated with the PDCCH monitoring using a list of a pair of reference signals configured based on one of the at least two TCI states, and monitor at least the first beam failure detection reference signal resource set associated with the PDCCH monitoring to identify a beam failure.

Some examples of the method, apparatuses, and non-transitory computer-readable medium described herein may further include operations, features, means, or instructions for determining that the first beam failure detection reference signal resource set includes the list of the pair of reference signals may be further based on the at least two TCI states.

One innovative aspect of the subject matter described in this disclosure can be implemented in a method for wireless communications at an apparatus of a UE. The method may include monitoring a PDCCH transmission using at least two TCI states, monitoring a radio link quality of the PDCCH based on a beam failure detection reference signal resource set, where the beam failure detection reference signal resource set defines two or more resource pair configurations, monitoring at least the beam failure detection reference signal resource set associated with the PDCCH monitoring to identify a radio link failure, and determining that the radio link failure has occurred when the radio link quality of the PDCCH is below a threshold amount for each of the two or more resource pair configurations.

Another innovative aspect of the subject matter described in this disclosure can be implemented in an apparatus for wireless communications at a UE. The apparatus may include a processing system configured to monitor a PDCCH transmission using at least two TCI states, monitor a radio link quality of the PDCCH based on a beam failure detection reference signal resource set, where the beam failure detection reference signal resource set defines two or more resource pair configurations, monitor at least the beam failure detection reference signal resource set associated with the PDCCH monitoring to identify a radio link failure, and determine that the radio link failure has occurred when the radio link quality of the PDCCH is below a threshold amount for each of the two or more resource pair configurations.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to monitor a PDCCH transmission using at least two TCI states, monitor a radio link quality of the PDCCH based on a beam failure detection reference signal resource set, where the beam failure detection reference signal resource set defines two or more resource pair configurations, monitor at least the beam failure detection reference signal resource set associated with the PDCCH monitoring to identify a radio link failure, and determine that the radio link failure has occurred when the radio link quality of the PDCCH is below a threshold amount for each of the two or more resource pair configurations.

Another innovative aspect of the subject matter described in this disclosure can be implemented in an apparatus for wireless communications at a UE. The apparatus may include means for monitoring a PDCCH transmission using at least two TCI states, monitoring a radio link quality of the PDCCH based on a beam failure detection reference signal resource set, where the beam failure detection reference signal resource set defines two or more resource pair configurations, monitoring at least the beam failure detection reference signal resource set associated with the PDCCH monitoring to identify a radio link failure, and determining that the radio link failure has occurred when the radio link quality of the PDCCH is below a threshold amount for each of the two or more resource pair configurations.

Another innovative aspect of the subject matter described in this disclosure can be implemented in a non-transitory computer-readable medium storing code for wireless communications at an apparatus of a UE. The code may include instructions executable by a processor to monitor a PDCCH transmission using at least two TCI states, monitor a radio link quality of the PDCCH based on a beam failure detection reference signal resource set, where the beam failure detection reference signal resource set defines two or more resource pair configurations, monitor at least the beam failure detection reference signal resource set associated with the PDCCH monitoring to identify a radio link failure, and determine that the radio link failure has occurred when the radio link quality of the PDCCH is below a threshold amount for each of the two or more resource pair configurations.

Some examples of the method, apparatuses, and non-transitory computer-readable medium described herein may further include operations, features, means, or instructions for providing an indication of the radio link failure to a higher layer of the UE.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 5 through 7 show flowcharts illustrating example methods that support using a beam failure detection RS resource set for PDCCH repetitions.

Like reference numbers and designations in the various drawings indicate like elements.

DETAILED DESCRIPTION

Figure 1:
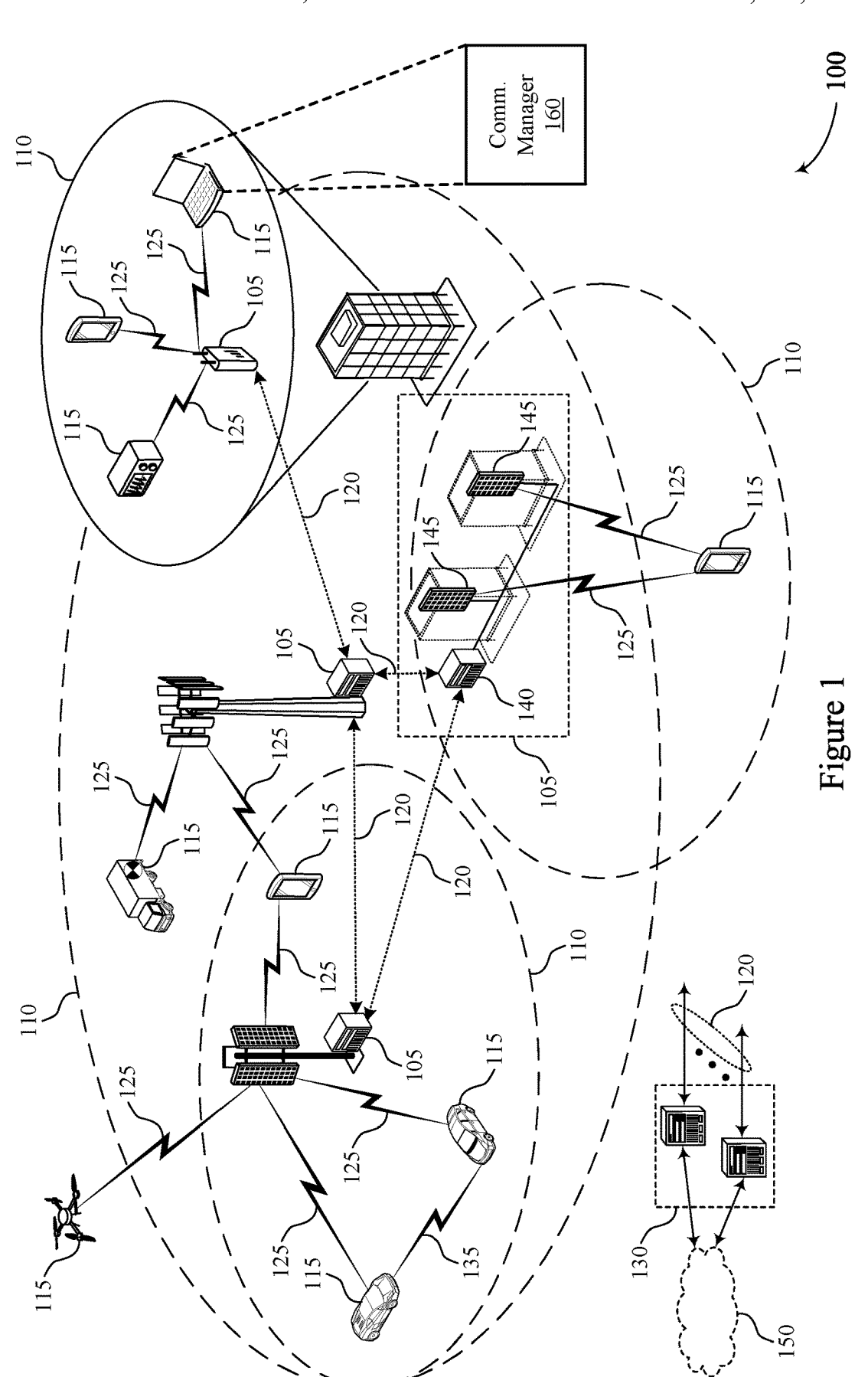
FIGS. 1 and 2 show examples of wireless communications systems that support using a beam failure detection resource set (RS) for physical downlink control channel (PDCCH) repetitions.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a user equipment (UE) may support beamforming or use of multiple beams for communication with a base station (BS), a network entity, or another device. The UE may support beam indication which may imply that some physical downlink control channel (PDCCH) transmissions may use a same transmission beam as a configured reference signal (RS) (such as a channel state information reference signal (CSI-RS) or synchronization signal (SS) block (SSB)). Beam indication may be based on configuration and downlink signaling of transmission configuration indication (TCI) states. TCI states may include, among other things, information about a CSI-RS or SSB. By associating a downlink transmission over PDCCH with a certain TCI, the base station may inform the UE that the UE can assume that the PDCCH transmission is transmitted using a same spatial filter as the reference signal associated with the TCI state. However, sometimes a beam failure can occur, and the beam may need to be re-established.

The UE may monitor the PDCCH for beam failure. The UE may detect that a beam failure has occurred when the error probability for the PDCCH exceeds a threshold value or based on a measurement of a reference signal transmitted over the PDCCH. For example, the UE may assume that a beam failure has occurred based on a measurement of a periodic CSI-RS associated with a PDCCH TCI state. In order to detect a beam failure based on measurements of a reference signal, the UE may be configured with one or more sets of indexes that can be used to detect beam failure.

A base station, such as a gNB, may configure the UE with configuration indexes that may be used for detecting beam failure and determining a candidate set of beams for beam recovery. For example, a base station may provide the UE, for each bandwidth part (BWP) of the serving cell, with a beam failure detection resource set q0 of periodic CSI-RS resource configuration indexes and a new beam candidate resource set q1 of periodic CSI-RS resource configuration indexes or synchronization signal/physical broadcast channel (PBCH) block indexes. A UE may use the set q0 for performing radio link quality measurements on a BWP of a serving cell, and use the set q1 to find a new candidate beam when the radio link quality is poor. However, in some implementations, the base station may not configure q0 for signaling overhead reduction or during a transition period when the configuration signal of q0 is not available. The UE may in these implementations determine the q0 set itself.

It may be straightforward for the UE to determine the beam failure detection resource set q0 when PDCCH is monitored with a single TCI state. For example, in 3GPP New Radio (NR) Release 15, PDCCH is monitored in a control resource set (CORESET), and a CORESET can be activated with a single active TCI state. However, in NR Release 17, PDCCH may be configured to be monitored with two TCI states. PDCCH transmissions or PDCCH candidates to be monitored with two TCI states may be associated with alternative numbers of CORESETs and search space (SS) sets. For example, a PDCCH transmission or a PDCCH candidate may be monitored in a single CORESET which can be configured with two active TCI states. Alternatively, a PDCCH transmission or a PDCCH candidate may be monitored in one SS set which is associated with two different CORESETs, and each CORESET may be configured with an active TCI state. Another alternative is that a PDCCH transmission or a PDCCH candidate may be monitored in two SS sets, and the two SS sets can be associated with two CORESETs each of which is configured with an active TCI state. Techniques described herein enable the UE to determine the beam failure detection resource set q0 when there can be PDCCH transmissions associated with two TCI states. In some examples, the techniques apply when the TCI states provide quasi co-location (CQL) Type D reference signals, which define spatial receive parameters.

In some implementations, such as where the base station does not configure the UE with a beam failure detection resource set q0 and at least one of the PDCCHs is monitored with two TCI states, the UE may determine the beam failure detection resource set q0. The UE may determine the beam failure detection resource set q0 to include periodic CSI-RS resource configuration indexes with the same values as the reference signal (RS) indexes in the RS resource sets indicated by one of the TCI-states that the UE uses for monitoring the PDCCH. Alternatively, the UE may determine the q0 set using indexes from both of the TCI states. If only one TCI state is used, the UE may use a characteristic of the TCI states to determine which TCI state to use.

In some implementations, the UE may determine two beam failure detection resource sets q0. The two sets may include periodic CSI-RS resource configuration indexes with the same values as the RS indexes in the RS resource sets indicated by the two TCI states. The UE may use a characteristic of the TCI states to decide which TCI state to use for which beam failure detection resource set q0.

In some implementations, the beam failure detection resource set q0 can be configured. In some examples, the base station may configure the beam failure detection resource set q0 and inform the UE of the configuration. In some examples, the beam failure detection resource set q0 may be configured as a list of a pair of RSs, where a pair of RSs can be configured with either one or two TCI states. Alternatively, the UE may determine that the beam failure detection resource set q0 may be configured as the list of the pair of RSs.

Techniques described herein also provide for the UE to determine when a radio link failure has occurred. In some implementations, the UE may not indicate a beam failure unless it detects a beam failure associated with both TCI states. For example, in some implementations, a physical layer (PHY) in the UE provides an indication to the higher layers when the radio link quality for all corresponding resource pair configurations in the q0 set that the UE uses to assess the radio link quality is worse than a threshold value. The radio link quality may be indicated for all corresponding resource pair configurations. Because there are at least two TCI states for the PDCCH monitoring, there can be at least a pair of RS resource sets jointly used for assessing the radio link quality. In the beam failure detection resource set q0, the UE may assess the link quality using the pair of RSs associated with two TCI states for the same PDCCH monitoring. In one example, the radio link quality for both of the RSs may meet the threshold before the UE sends the beam failure indication. In another example, the radio link quality when assessed jointly using both the RSs may meet the threshold before the UE sends the beam failure indication.

Particular implementations of the subject matter described in this disclosure can be implemented to realize one or more of the following potential advantages. For example, the described techniques may lead to improved efficiency and communications, as well as improving configurations for communications using multiple TCI states. The described techniques also may improve beam failure detection. This may lead to faster, more robust, and more accurate link failure detections, which may improve user experience. The described techniques also may improve power savings, leading to increased battery life. Since the PDCCH monitoring with two TCI states is mainly used for improving the transmission reliability, particular implementations of the subject matter may enable more accurate beam failure recovery, which may reduce the interruption led by frequent beam failure recovery attempts due to mismatched beam failure detection.

FIG. 1 illustrates an example of a wireless communications system 100 that supports using a beam failure detection RS resource set for PDCCH repetitions. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a NR network. In some examples, the wireless communications system 100 may support enhanced broadband communications, ultra-reliable (such as mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (such as core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (such as via an S1, N2, N3, or another interface). The base stations 105 may communicate with one another over the backhaul links 120 (such as via an X2, Xn, or other interface) either directly (such as directly between base stations 105), or indirectly (such as via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (such as in a carrier aggregation configuration), a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a CORESET) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other implementations, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as radio heads and ANCs) or consolidated into a single network device (such as a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (such as a base station 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (such as antenna panels) to conduct beamforming operations for directional communications with a UE 115. Some signals (such as synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (such as a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (such as by a base station 105 or a UE 115) may be performed using multiple beam directions, and the device may use a combination of digital precoding or radio frequency beamforming to generate a combined beam for transmission (such as from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as when receiving a data signal). The single receive configuration may be aligned in a beam direction determined based on listening according to different receive configuration directions (such as a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may include a communications manager 160. In some implementations, the communications manager 160 may monitor a PDCCH transmission using at least two TCI states, identify a characteristic of one or more of the at least two TCI states, determine a first beam failure detection reference signal resource set associated with the PDCCH monitoring using the one or more of the at least two TCI states based on the characteristic of the one or more of the at least two TCI states, and monitor the first beam failure detection reference signal resource set associated with the PDCCH monitoring to identify a beam failure.

In some other implementations, the communications manager 160 also may monitor a PDCCH transmission using at least two TCI states, determine a first beam failure detection reference signal resource set associated with the PDCCH monitoring using a list of a pair of reference signals configured based on one of the at least two TCI states, and monitor at least the first beam failure detection reference signal resource set associated with the PDCCH monitoring to identify a beam failure.

In some other implementations, the communications manager 160 also may monitor a PDCCH transmission using at least two TCI states, monitor a radio link quality of the PDCCH based on a beam failure detection reference signal resource set, where the beam failure detection reference signal resource set defines two or more resource pair configurations, monitor at least the beam failure detection reference signal resource set associated with the PDCCH monitoring to identify a radio link failure, and determine that the radio link failure has occurred when the radio link quality of the PDCCH is below a threshold amount for each of the two or more resource pair configurations.

Figure 2:
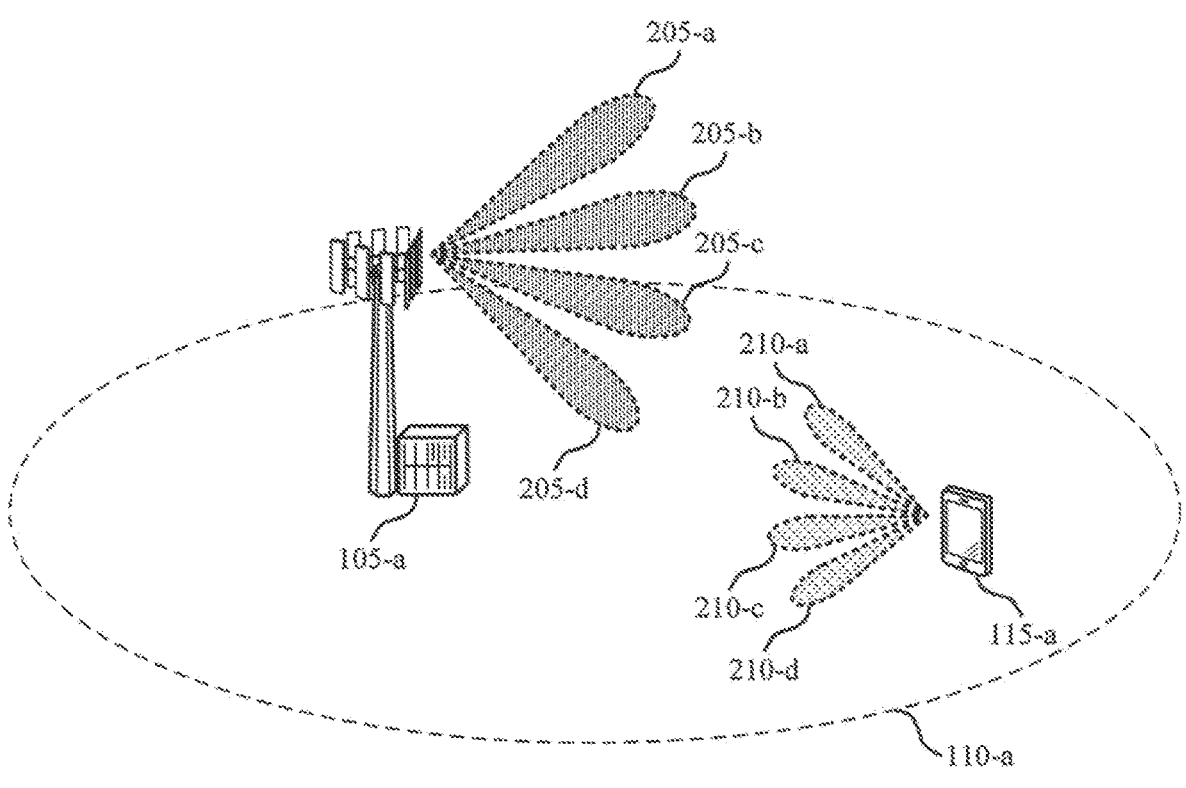

FIG. 2 shows an example of a wireless communications system 200 that supports using a beam failure detection RS resource set for PDCCH repetitions. In some examples, wireless communications system 200 may implement aspects of wireless communication system 100. The wireless communications system 200 includes base station 105-a and a UE 115-a, which may be examples of the corresponding devices described with reference to FIG. 1.

The base station 105-a may support communications with wireless devices inside coverage area 110-a. The base station 105-a may transmit signals over one or more beams 205-a through 205-d (referred to collectively herein as beams 205). In some other examples, the base station 105-a may use more or less than the four beams 205 shown in FIG. 2. For example, the base station 105-a may make PDCCH transmissions over beams 205-c and 205-d to the UE 115-a. In some other examples, the base station 105-a may make PDCCH transmissions using different arrangements and numbers of beams 205. The UE 115-a may likewise transmit beams 210-a through 210-d (referred to collectively herein as beams 210).

The base station 105-a and the UE 115-a may support beam indication which may imply that some PDCCH transmissions may use a same transmission beam as a configured reference signal (such as a CSI-RS or an SSB). Beam indication may be based on configuration and downlink signaling of TCI states. The TCI state may include a resource set of RS and information about a CSI-RS or SSB. For example, the TCI state may include a first RS in the resource set for QCL-type A assumption indication, and a second RS in the resource set for QCL-type D assumption indication. By associating a downlink transmission over PDCCH with a certain TCI state including a RS in the resource set providing QCL-type D assumption indication, the base station 105-a may inform the UE 115-a that it can assume that the PDCCH transmission is transmitted using a same spatial filter as the reference signal associated with the TCI state.

PDCCH transmissions or PDCCH candidates to be monitored with two TCI states may be associated with alternative numbers of CORESETs and SS sets. For example, a PDCCH transmission or a PDCCH candidate may be monitored in a single CORESET which is configured with two active TCI states. Alternatively, a PDCCH transmission or a PDCCH candidate may be monitored in one SS set which is associated with two different CORESETs, and each CORESET may be configured with an active TCI state. Another alternative is that a PDCCH transmission or a PDCCH candidate may be monitored in two SS sets, and two SS sets can be associated with two CORESETs each of which is configured with an active TCI state. These alternatives may affect the following aspects of the communications: multiplexing schemes (TDM, FDM, spatial division multiplexing (SDM), or combined schemes), blind decoding or CCE limits, over-booking, CCE and resource element group (REG) mapping, PDCCH candidate CCEs (i.e., hashing function), CORE-SET/SS set configurations, and other procedural impacts.

In some implementations, the base station 105-b may transmit PDCCH transmissions using one or more beams 205 associated with one or more TCI states. The UE 115-a may receive the PDCCH transmissions over two or more beams 205 indicated by the RS resource sets associated with the two or more TCI states. For example, the UE 115-a may monitor for the PDCCH transmission using at least two TCI states.

However, there may be situations in which at least one of the beams 205 fails. Beam failure may occur due to an obstruction in the pathway, power loss, interference, a change in channel conditions, multipath effects, or the like. The UE 115-a may need to determine when a beam failure has occurred. Techniques described herein enable the UE 115-a to determine when at least one beam failure has occurred for multi-beam transmissions.

The UE 115-a may monitor the radio link quality of PDCCH transmissions for beam failure. In some examples, the UE 115-a may detect that a beam failure has occurred when the error probability for the PDCCH transmissions exceeds a threshold value. In some other examples, the UE 115-a may detect that a beam failure has occurred based on a measurement of a reference signal associated with the PDCCH. For example, the UE 115-a may assume that a beam failure has occurred based on a measurement of a periodic CSI-RS associated with a PDCCH TCI state. In order to detect a beam failure based on measurements of a reference signal, the UE 115-a may use one or more sets of indexes to detect beam failure. Techniques described herein provide ways for the UE 115-a to determine the one or more sets of indexes, how to detect beam failures, and how to report beam failures.

Figure 3:
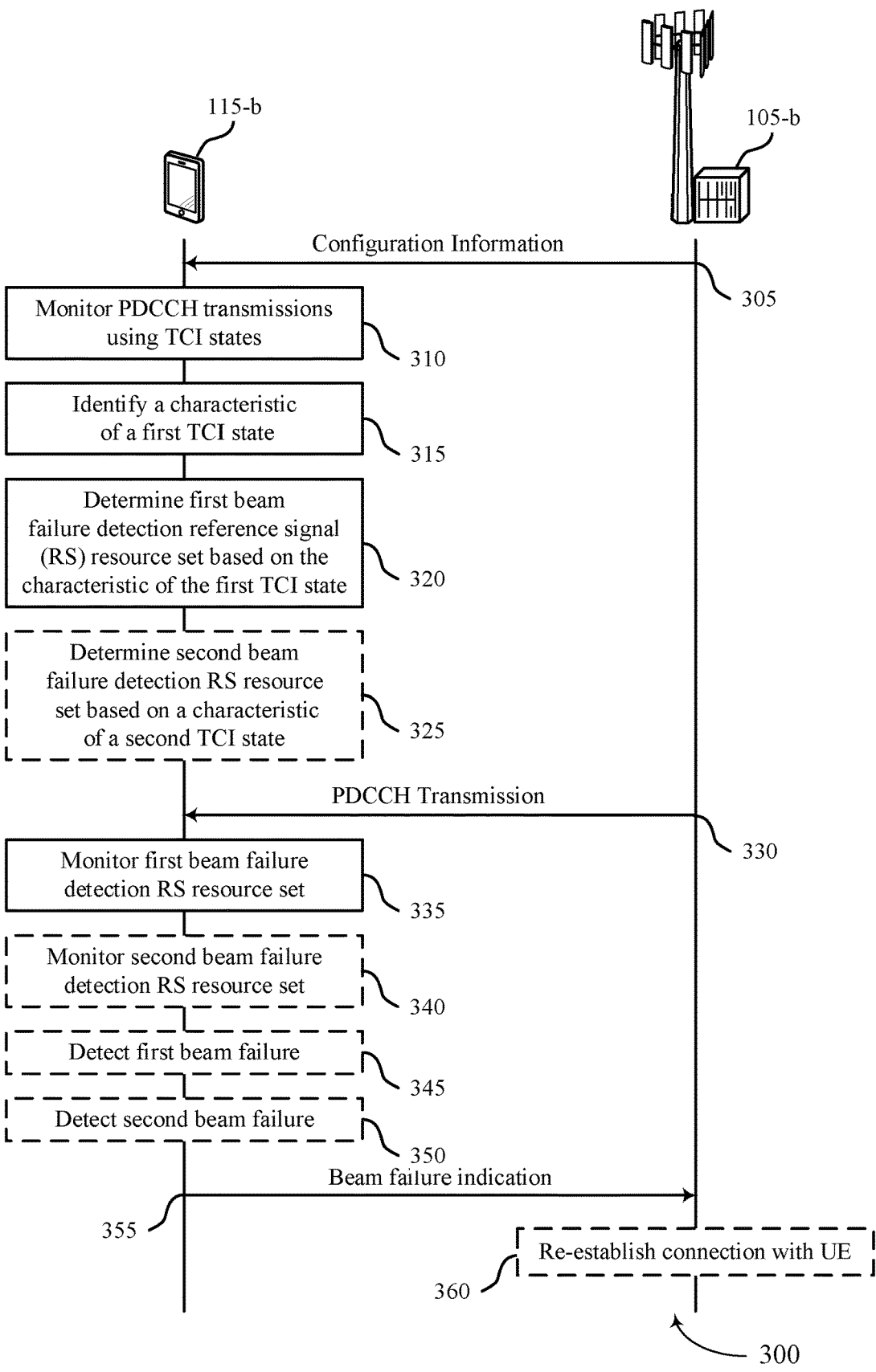
FIG. 3 shows an example of a process flow that supports using a beam failure detection RS resource set for PDCCH repetitions.

FIG. 3 shows an example of a process flow 300 that supports using a beam failure detection RS resource set for PDCCH repetitions. In some examples, the process flow 300 may implement aspects of wireless communication system 100. The process flow 300 may include a base station 105-b and a UE 115-b, which may be examples of the corresponding devices described with reference to FIGS. 1 and 2.

The base station 105-b may send configuration information 305 to the UE 115-b. The configuration information 305 may include one or more TCI states. In some examples, the configuration information 305 may include a downlink control information (DCI) message, which may include the one or more TCI states. The configuration information 305 may indicate to the UE 115-b that a PDCCH transmission or PDCCH candidate may be enabled to be monitored with two TCI states. The base station 105-a may send PDCCH transmissions using at least one CORESET associated with the at least two TCI states, one search space set associated with at least two CORESETs, or two search space sets associated with two CORESETs each having an active TCI state.

In some examples, a UE can be provided, for each BWP of a serving cell, a set q0 of periodic CSI-RS resource configuration indexes by failureDetectionResources and a set q1 of periodic CSI-RS resource configuration indexes and/or SS/PBCH block indexes by candidateBeamRSList, candidateBeamRSListExt-r16, candidateBeamRSSCellList-r16, or any other such suitable signaling for radio link quality measurements on the BWP of the serving cell. If the UE is not provided q0 by failureDetectionResources or beamFailureDetectionResourceList for a BWP of the serving cell, the UE determines the set q0 to include periodic CSI-RS resource configuration indexes with same values as the RS indexes in the RS sets indicated by TCI-State for respective CORESETs that the UE uses for monitoring PDCCH, and if there are two RS indexes in the RS sets indicated by a TCI state, the set q0 includes the RS index with QCL-TypeD configuration for the TCI state.

The UE 115-b may monitor for PDCCH transmissions using the TCI states at 310. The UE 115-b may monitor for PDCCH transmissions using at least one CORESET associated with the at least two TCI states, one search space set associated with at least two CORESETs, or two search space sets associated with two CORESETs each having an active TCI state.

In some implementations, the configuration information 305 may not include failureDetectionResources for the set q0. The UE 115-*b* may determine the set q0 that it may use to detect beam failures. In some examples, the UE 115-*b* may report two new beam indications to the base station 105-*b*, which may be in a q_{new} element. When at least one of the PDCCH transmissions or PDCCH candidates is monitored with two TCI states, and the beam failure detection RS set q0 is not configured for a BWP of the serving cell, the UE 115-*b* may determine the set q0 to include periodic CSI-RS resource configuration indexes with the same values as the RS indexes in the RS sets indicated by the one or two TCI states that the UE 115-*b* uses for monitoring PDCCH. If there are two RS indexes in the RS sets indicated by a TCI state, the set q0 includes the RS index with QCL-Type D configuration for the TCI state.

If there are two TCI states (such as the first TCI state and the second TCI state) for monitoring the same PDCCH, the UE 115-*b* will determine further how to include the RS indexes for the two TCI states into the set q0. For example, the two TCI states for monitoring the same PDCCH may provide QCL-Type D RS, and there may be two QCL-Type D RSs for monitoring the same PDCCH. At 315, the UE 115-*b* may identify a characteristic of a first TCI state in order to determine a beam failure detection resource RS set. For example, if there are two TCI states (such as the first TCI state and the second TCI state) for monitoring a same PDCCH, the UE 115-*b* may determine the set q0 to include periodic CSI-RS resource configuration indexes with the same values as the RS indexes in the RS sets indicated by the first TCI states that the UE 115-*b* uses for monitoring the PDCCH. The characteristic of the first TCI state may be based on, for example, an order of the TCI states (such as a first TCI state may be used), a smaller TCI state identification, a smaller CORESET identification, or a smaller search space identification for monitoring the same PDCCH. In some examples, both the first and second TCI states may be used in the beam failure detection resource RS set. For example, if there are two TCI states (such as the first TCI state and the second TCI state) for monitoring a same PDCCH, the UE 115-*b* may determine the set q0 to include periodic CSI-RS resource configuration indexes with the same values as the RS indexes in the RS sets indicated by the first TCI states and the RS indexed in the RS sets indicated by the second TCI state that the UE 115-*b* uses for monitoring PDCCH.

At 320, the UE 115-*b* may determine a first beam failure detection resource RS set based on the characteristic of the first TCI state. For example, the UE 115-*b* may set the first beam failure detection reference signal resource set to include periodic CSI-RS resource configuration indexes having values the same as values of reference signal indexes in a reference signal set indicated as a first TCI state by the order of the at least two TCI states, and if there are two RS indexes in a reference signal set indicated by the first TCI state, the first beam failure detection reference signal resource set includes RS indexes with QCL-Type D configuration for the corresponding TCI state. In another example, the UE 115-*b* may select a first TCI state of the at least two TCI states based at least in part on the identification and set the first beam failure detection reference signal resource set to include periodic CSI-RS resource configuration indexes having values the same as values of reference signal indexes in a reference signal set indicated by the first TCI state.

In some examples, the UE 115-*b* may determine the set q0 to include a list of a pair of RSs, where a pair of RSs are associated with either one or two TCI states for monitoring the same PDCCH. For example, the UE 115-*b* may determine a first beam failure detection reference signal resource set associated with the PDCCH monitoring using a list of a pair of reference signals configured based at least in part on one of the at least two TCI states for monitoring the same PDCCH. In some examples, determining that the first beam failure detection reference signal resource set includes the list of the pair of reference signals may be further based at least in part on the at least two TCI states for monitoring the same PDCCH.

In some other examples, the beam failure detection reference signal resource set defines or can be configured with two or more resource pair configurations, where each of the resource pair configurations can have one or two periodic RSs.

In some implementations, the UE 115-*b* may determine a second beam failure detection resource RS set at 325. The second beam failure detection reference signal resource set may be associated with the PDCCH monitoring. In some examples, the UE 115-*b* may determine the first beam failure detection reference signal resource set to include periodic CSI-RS resource configuration indexes having values the same as values of reference signal indexes in a first reference signal set indicated by a first TCI state of the at least two TCI states, and determine the second beam failure detection reference signal resource set to include periodic CSI-RS resource configuration indexes having values the same as values of reference signal indexes in a second reference signal set indicated by a second TCI state of the at least two TCI states. If there are two RS indexes in a reference signal set indicated by the TCI state, the corresponding beam failure detection reference signal resource set includes RS indexes with QCL-Type D configuration for the corresponding TCI state.

In some other implementations, the UE 115-*b* may set the first beam failure detection reference signal resource set to include periodic CSI-RS resource configuration indexes having values the same as values of reference signal indexes in a first reference signal set indicated by a TCI state of the at least two TCI states associated with a smaller TRP identification, a smaller TCI state identification, a smaller CORESET identification, or a smaller search space identification for monitoring the same PDCCH. The UE 115-*b* may set the second beam failure detection reference signal resource set to include periodic CSI-RS resource configuration indexes having values the same as values of reference signal indexes in a second reference signal set indicated by a second TCI state of the at least two TCI states for monitoring the same PDCCH.

The base station 105-*b* may send one or more PDCCH transmissions 330 to the UE 115-*b*. At 335, the UE 115-*b* may monitor the first beam failure detection resource RS set for a potential beam failure. In some examples, at 340, the UE 115-*b* may monitor a second beam failure detection resource RS set for beam failure. Monitoring the beam failure detection resource RS sets may include taking measurements of the associated reference signals (such as the periodic CSI-RS associated with the TCI state).

At 345, the UE 115-*b* may detect that a beam failure has occurred. The UE 115-*b* may determine that a beam failure has occurred based at least in part on the monitoring at least the first beam failure detection reference signal resource set. In some examples, the UE 115-*b* may determine that the radio link failure has occurred when the radio link quality of the PDCCH is below a threshold amount for each of the two or more resource pair configurations. The threshold amount may be configurable by the UE 115-b or the base station 105-b. At 350, if applicable, the UE 115-b may detect that a second beam failure has occurred.

The UE 115-b may provide an indication 355 of the detected one or more beam failures to the base station 105-b. The indication 355 may identify which beam(s) had a beam failure. The indication also may include a set of candidate beams (such as q1) for re-establishing the connection. In some implementations, the UE 115-b provides an indication of the beam failure to a network layer higher than the physical layer at the UE 115-b.

At 360, the base station 105-b may attempt to re-establish the connection with the UE 115-b. The base station 105-b may use the list of candidate beams if it is included in the beam failure indication 255.

The described techniques may improve efficiency and communications for communications using multiple TCI states, improve beam failure detection, and improve beam failure recovery. The described techniques may improve user experience through improved throughput, more accurate link failure detections, and improved power savings.

Figure 4:
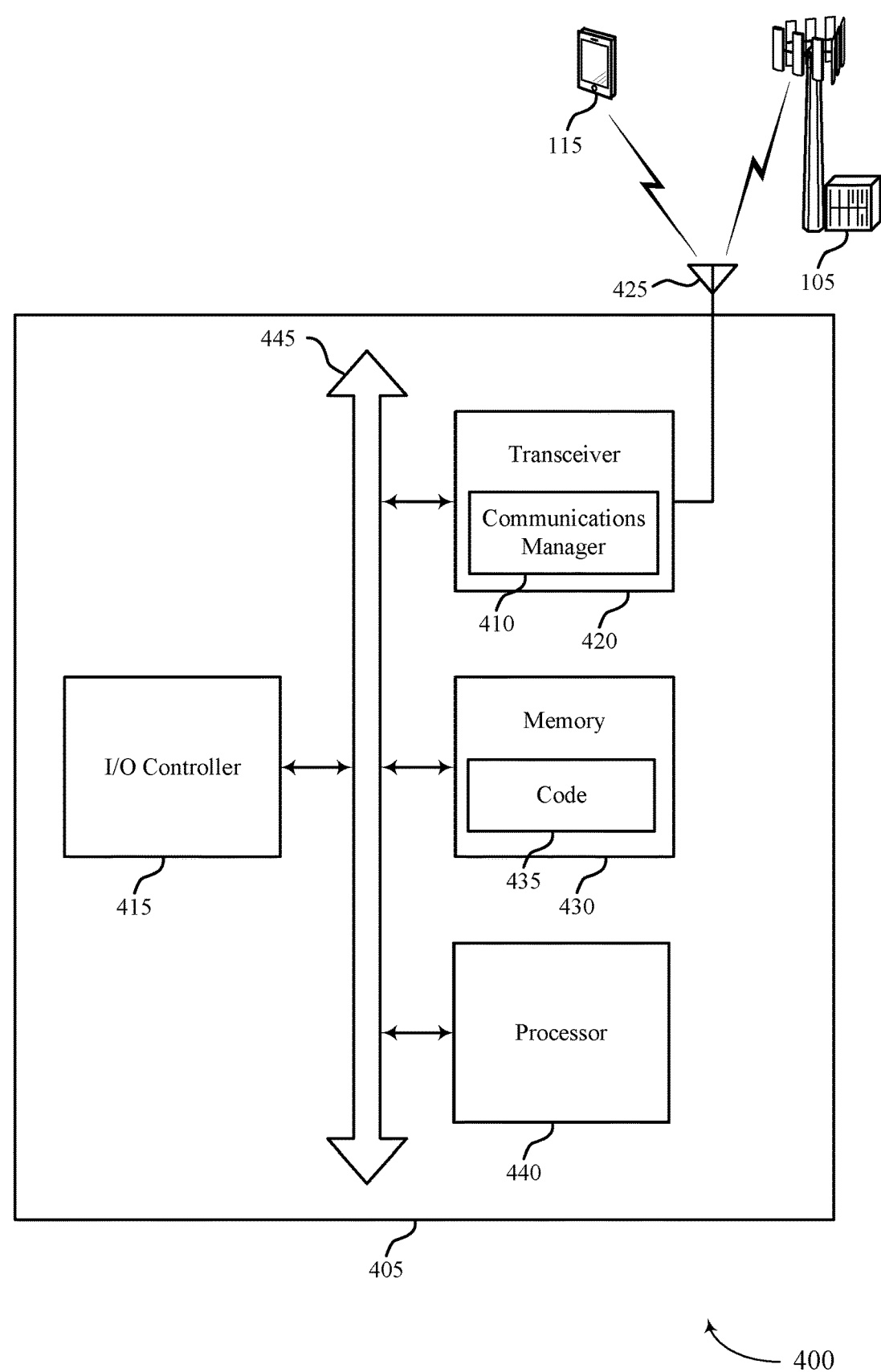
FIG. 4 shows a diagram of a system including a device that supports using a beam failure detection RS resource set for PDCCH repetitions.

FIG. 4 shows a diagram of a system 400 including a device 405 that supports using a beam failure detection RS resource set for PDCCH repetitions. The device 405 may be an example of or include the components of a UE 115 as described herein. The device 405 may include components for bi-directional voice and data communications including components for transmitting and receiving communications, including a communications manager 410, an I/O controller 415, a transceiver 420, an antenna 425, memory 430, and a processor 440. These components may be in electronic communication via one or more buses (such as bus 445).

The communications manager 410 may implement at least some of the techniques described herein. The communications manager 410 may determine that a PDCCH transmission may be sent using at least two TCI states. The communications manager 410 may monitor for the PDCCH transmission using the at least two TCI states. The communications manager 410 may identify a characteristic of one or more of the at least two TCI states. The communications manager 410 may use the characteristic of the one or more of the at least two TCI states in order to determine a beam failure detection reference signal resource set.

In some examples, the communications manager 410 may set the first beam failure detection reference signal resource set to include periodic CSI-RS resource configuration indexes having values the same as values of reference signal indexes in a reference signal set indicated according to the characteristic. For example, communications manager 410 may set the first beam failure detection reference signal resource set to include periodic CSI-RS resource configuration indexes having values the same as values of reference signal indexes in a reference signal set of a first TCI state. The first TCI state may be indicated by an order of the at least two TCI states. In another example, the first TCI state may be indicated based on an identification or a configuration signal sent by the base station.

In some examples, the communications manager 410 may select the first TCI state is based on a smallest identification of the at least two TCI states. In some examples, the identification includes one of a TCI state identification, a CORESET identification, or a search space identification. In some examples, determining the first beam failure detection reference signal resource set further includes setting the first beam failure detection reference signal resource set to include periodic CSI-RS resource configuration indexes having values the same as values of reference signal indexes in a first reference signal set indicated by a TCI state of the at least two TCI states associated with a smaller TRP identification, the smaller TCI state identification, the smaller CORESET identification, or the smaller search space identification.

In another implementation, the communications manager 410 may determine a first beam failure detection reference signal resource set associated with the PDCCH monitoring using a list of a pair of reference signals configured based on one of the at least two TCI states.

In some examples, the communications manager 410 determines a second beam failure detection reference signal resource set. In some examples, determining the second beam failure detection reference signal resource set further includes setting the second beam failure detection reference signal resource set to include periodic CSI-RS resource configuration indexes having values the same as values of reference signal indexes in a second reference signal set indicated by a second TCI state of the at least two TCI states.

Regardless of how the first beam failure detection reference signal resource set is determined, the communications manager 410 may monitor the first beam failure detection reference signal resource set associated with the PDCCH monitoring to identify a beam failure.

In some implementations, the communications manager 410 may monitor a radio link quality of the PDCCH based on a beam failure detection reference signal resource set, where the beam failure detection reference signal resource set defines two or more resource pair configurations. In some examples, the communications manager 410 may determine a second beam failure detection reference signal resource set associated with the PDCCH monitoring.

The communications manager 410 also may monitor a PDCCH transmission using at least two TCI states, monitor a radio link quality of the PDCCH based on a beam failure detection reference signal resource set, where the beam failure detection reference signal resource set defines two or more resource pair configurations, monitor at least the beam failure detection reference signal resource set associated with the PDCCH monitoring to identify a radio link failure, and determine that the radio link failure has occurred when the radio link quality of the PDCCH is below a threshold amount for each of the two or more resource pair configurations.

In some examples, the communications manager 410 may monitor at least one CORESET associated with the at least two TCI states, monitor one search space set associated with at least two CORESETs, or monitor two search space sets associated with two CORESETs each having an active TCI state. The communications manager 410 may determine a first beam failure detection reference signal resource set associated with the PDCCH monitoring using the one or more of the at least two TCI states based on the characteristic of the one or more of the at least two TCI states.

In some implementations, the communications manager 410 may determine that a radio link failure has occurred based at least in part on the monitoring. In some examples, the communications manager 410 may determine that the radio link failure has occurred when the radio link quality of the PDCCH is below a threshold amount for each of the two or more resource pair configurations. In some examples, the communications manager 410 may detect the radio link failure based on monitoring at least the first beam failure detection reference signal resource set.

In some examples, the communications manager 410 may send an indication of the radio link failure to a base station.

In some examples, the communications manager 410 may provide an indication of the radio link failure to a higher layer of the UE.

The communications manager 410, or its sub-components, may be implemented in hardware, code (such as software or firmware) executed by a processor, or any combination thereof. If implemented in code executed by a processor, the functions of the communications manager 410, or its sub-components may be executed by a general-purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described in the present disclosure.

The communications manager 410, or its sub-components, may be physically located at various positions, including being distributed such that portions of functions are implemented at different physical locations by one or more physical components. In some examples, the communications manager 410, or its sub-components, may be a separate and distinct component in accordance with various aspects of the present disclosure. In some examples, the communications manager 410, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 410, when functioning as a processor or a processing system, may obtain the signaling from a receiver, such as the transceiver 420, using a first interface and may output signaling for transmission via a transmitter, such as the transceiver 420, using a second interface.

The I/O controller 415 may manage input and output signals for the device 405. The I/O controller 415 also may manage peripherals not integrated into the device 405. In some examples, the I/O controller 415 may represent a physical connection or port to an external peripheral. In some examples, the I/O controller 415 may utilize an operating system such as iOS®, ANDROID®, MS-DOS®, MS-WINDOWS®, OS/2®, UNIX®, LINUX®, or another known operating system. In some other examples, the I/O controller 415 may represent or interact with a modem, a keyboard, a mouse, a touchscreen, or a similar device. In some examples, the I/O controller 415 may be implemented as part of a processor. In some examples, a user may interact with the device 405 via the I/O controller 415 or via hardware components controlled by the I/O controller 415.

The transceiver 420 may communicate bi-directionally, via one or more antennas, wired, or wireless links as described above. For example, the transceiver 420 may represent a wireless transceiver and may communicate bi-directionally with another wireless transceiver. The transceiver 420 also may include a modem to modulate the packets and provide the modulated packets to the antennas for transmission, and to demodulate packets received from the antennas. The transceiver 420 may transmit or receive information related to PDCCH transmissions, beam failure detection, and beam failure recovery.

In some examples, the wireless device may include a single antenna 425. However, in some examples the device may have more than one antenna 425, which may be capable of concurrently transmitting or receiving multiple wireless transmissions.

The memory 430 may include random-access memory (RAM) and read-only memory (ROM). The memory 430 may store computer-readable, computer-executable code 435 including instructions that, when executed, cause the processor to perform various functions described herein. In some examples, the memory 430 may contain, among other things, a basic I/O system (BIOS) which may control basic hardware or software operation such as the interaction with peripheral components or devices.

The processor 440 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some examples, the processor 440 may be configured to operate a memory array using a memory controller. In some other examples, a memory controller may be integrated into the processor 440. The processor 440 may be configured to execute computer-readable instructions stored in a memory (such as the memory 430) to cause the device 405 to perform various functions (such as functions or tasks supporting using a beam failure detection RS resource set for PDCCH repetitions).

The processor 440 may be any one or more suitable processors capable of executing scripts or instructions of one or more software programs stored in the device 405 (such as within the memory 430). For example, the processor 440 may execute the communications manager 410 or the I/O controller 415.

In some implementations, the processor 440 may be a component of a processing system. A processing system may generally refer to a system or series of machines or components that receives inputs and processes the inputs to produce a set of outputs (which may be passed to other systems or components of, for example, the device 405). For example, a processing system of the device 405 may refer to a system including the various other components or sub-components of the device 405.

The processing system of the device 405 may interface with other components of the device 405, and may process information received from other components (such as inputs or signals), output information to other components, etc. For example, a chip or modem of the device 405 may include a processing system, a first interface to output information, and a second interface to obtain information. In some examples, the first interface may refer to an interface between the processing system of the chip or modem and a transmitter, such that the device 405 may transmit information output from the chip or modem. In some examples, the second interface may refer to an interface between the processing system of the chip or modem and a receiver, such that the device 405 may obtain information or signal inputs, and the information may be passed to the processing system. A person having ordinary skill in the art will readily recognize that the first interface also may obtain information or signal inputs, and the second interface also may output information or signal outputs.

The code 435 may include instructions to implement aspects of the present disclosure, including instructions to support wireless communications. The code 435 may be stored in a non-transitory computer-readable medium such as system memory or other type of memory. In some examples, the code 435 may not be directly executable by the processor 440 but may cause a computer (such as when compiled and executed) to perform functions described herein.

In some examples, the communications manager 410 may be implemented as an integrated circuit or chipset for a mobile device modem, and a receiver and a transmitter may be implemented as analog components (for example, amplifiers, filters, antennas) coupled with the mobile device modem to enable wireless transmission and reception over one or more bands.

The communications manager 410 as described herein may be implemented to realize one or more potential advantages. In some implementations of the present disclosure, the communications manager 410 may determine at least one beam failure detection reference signal resource set associated with the PDCCH monitoring using the one or more of the at least two TCI states. The communications manager 410 may use the beam failure detection reference signal resource set to detect a beam failure. As such, the communications manager 410 may detect beam failures for communications using multiple beams with two or more TCI states, which may result in improved throughput, improved user experience, and improved power savings and longer battery life of the device 405.

FIG. 5 shows a flowchart illustrating an example method 500 that supports using a beam failure detection RS resource set for PDCCH repetitions. The operations of method 500 may be implemented by a UE 115 or its components as described herein. For example, the operations of method 500 may be performed by a communications manager as described with reference to FIGS. 1 and 4. In some examples, a UE may execute a set of instructions to control the functional elements of the UE to perform the functions described below. Additionally, or alternatively, a UE may perform aspects of the functions described below using special-purpose hardware.

At 505, the UE may monitor a PDCCH transmission using at least two TCI states. The operations of 505 may be performed according to the methods described herein. In some examples, aspects of the operations of 505 may be performed by a communications manager as described with reference to FIGS. 1 and 4.

At 510, the UE may identify a characteristic of one or more of the at least two TCI states. The operations of 510 may be performed according to the methods described herein. In some examples, aspects of the operations of 510 may be performed by a communications manager as described with reference to FIGS. 1 and 4.

At 515, the UE may determine a first beam failure detection reference signal resource set associated with the PDCCH monitoring using the one or more of the at least two TCI states based on the characteristic of the one or more of the at least two TCI states. The operations of 515 may be performed according to the methods described herein. In some examples, aspects of the operations of 515 may be performed by a communications manager as described with reference to FIGS. 1 and 4.

At 520, the UE may monitor the first beam failure detection reference signal resource set associated with the PDCCH monitoring to identify a beam failure. The operations of 520 may be performed according to the methods described herein. In some examples, aspects of the operations of 520 may be performed by a communications manager as described with reference to FIGS. 1 and 4.

FIG. 6 shows a flowchart illustrating an example method 600 that supports using a beam failure detection RS resource set for PDCCH repetitions. The operations of method 600 may be implemented by a UE 115 or its components as described herein. For example, the operations of method 600 may be performed by a communications manager as described with reference to FIGS. 1 through 4. In some examples, a UE may execute a set of instructions to control the functional elements of the UE to perform the functions described below. Additionally, or alternatively, a UE may perform aspects of the functions described below using special-purpose hardware.

At 605, the UE may monitor a PDCCH transmission using at least two TCI states. The operations of 605 may be performed according to the methods described herein. In some examples, aspects of the operations of 605 may be performed by a communications manager as described with reference to FIGS. 1 and 4.

At 610, the UE may determine a first beam failure detection reference signal resource set associated with the PDCCH monitoring using a list of a pair of reference signals configured based on one of the at least two TCI states. The operations of 610 may be performed according to the methods described herein. In some examples, aspects of the operations of 610 may be performed by a communications manager as described with reference to FIGS. 1 and 4.

At 615, the UE may monitor at least the first beam failure detection reference signal resource set associated with the PDCCH monitoring to identify a beam failure. The operations of 615 may be performed according to the methods described herein. In some examples, aspects of the operations of 615 may be performed by a communications manager as described with reference to FIGS. 1 and 4.

FIG. 7 shows a flowchart illustrating an example method 700 that supports using a beam failure detection RS resource set for PDCCH repetitions. The operations of method 700 may be implemented by a UE 115 or its components as described herein. For example, the operations of method 700 may be performed by a communications manager as described with reference to FIGS. 1 and 4. In some examples, a UE may execute a set of instructions to control the functional elements of the UE to perform the functions described below. Additionally, or alternatively, a UE may perform aspects of the functions described below using special-purpose hardware.

At 705, the UE may monitor a PDCCH transmission using at least two TCI states. The operations of 705 may be performed according to the methods described herein. In some examples, aspects of the operations of 705 may be performed by a communications manager as described with reference to FIGS. 1 and 4.

At 710, the UE may monitor a radio link quality of the PDCCH based on a beam failure detection reference signal resource set, where the beam failure detection reference signal resource set defines two or more resource pair configurations. The operations of 710 may be performed according to the methods described herein. In some examples, aspects of the operations of 710 may be performed by a communications manager as described with reference to FIGS. 1 and 4.

At 715, the UE may monitor at least the beam failure detection reference signal resource set associated with the PDCCH monitoring to identify a radio link failure. The operations of 715 may be performed according to the methods described herein. In some examples, aspects of the operations of 715 may be performed by a communications manager as described with reference to FIGS. 1 and 4.

At 720, the UE may determine that the radio link failure has occurred when the radio link quality of the PDCCH is below a threshold amount for each of the two or more resource pair configurations. The operations of 720 may be performed according to the methods described herein. In some examples, aspects of the operations of 720 may be performed by a communications manager as described with reference to FIGS. 1 and 4.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some examples be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communication at a user equipment (UE), comprising:
    a processing system configured to:
        monitor a physical downlink control channel (PDCCH) transmission using at least two transmission control indicator (TCI) states; and
        monitor a first beam failure detection reference signal resource set associated with the PDCCH monitoring for a beam failure, the first beam failure detection reference signal resource set being determined using one or more of the at least two TCI states, wherein the first beam failure detection reference signal resource set comprises one or more first reference signal indexes of a first reference signal set associated with a first TCI state of the at least two TCI states and comprises one or more second reference signal indexes of a second reference signal set associated with a second TCI state of the at least two TCI states.

2. The apparatus of claim 1, wherein a characteristic of the one or more of the at least two TCI states is an order of the at least two TCI states that is identified in accordance with monitoring the PDCCH using the at least two TCI states, and wherein the processing system is further configured to:

set the first beam failure detection reference signal resource set to include periodic channel state information reference signal (CSI-RS) resource configuration indexes having values the same as values of reference signal indexes in a reference signal set indicated as the first TCI state by the order of the at least two TCI states.

3. The apparatus of claim 1, wherein a characteristic of the one or more of the at least two TCI states is an identification that is identified in accordance with monitoring the PDCCH using the at least two TCI states, and wherein the processing system is further configured to:

select the first TCI state of the at least two TCI states in accordance with the identification; and set the first beam failure detection reference signal resource set to include periodic channel state information reference signal (CSI-RS) resource configuration indexes having values the same as values of reference signal indexes in the first reference signal set indicated by the first TCI state.

4. The apparatus of claim 3, wherein the identification includes one of a TCI state identification, a control resource set (CORESET) identification, or a search space identification.

5. The apparatus of claim 3, wherein the processing system configured to select the first TCI state is further configured to select the first TCI state in accordance with a smallest identification of the at least two TCI states.

6. The apparatus of claim 1, wherein a second beam failure detection reference signal resource set associated with the PDCCH monitoring is determined.

7. The apparatus of claim 6, wherein the processing system is further configured to:

determine the first beam failure detection reference signal resource set in accordance with setting the first beam failure detection reference signal resource set to include periodic channel state information reference signal (CSI-RS) resource configuration indexes having values the same as values of reference signal indexes in the first reference signal set indicated by the first TCI state of the at least two TCI states; and determine the second beam failure detection reference signal resource set in accordance with setting the second beam failure detection reference signal resource set to include periodic CSI-RS resource configuration indexes having values the same as values of reference signal indexes in the second reference signal set indicated by the second TCI state of the at least two TCI states.

8. The apparatus of claim 6, wherein the processing system is further configured to:

determine the first beam failure detection reference signal resource set in accordance with setting the first beam failure detection reference signal resource set to include periodic channel state information reference signal (CSI-RS) resource configuration indexes having values the same as values of reference signal indexes in the first reference signal set indicated by the first TCI state of the at least two TCI states associated with a smaller transmit/reception point (TRP) identification, a smaller TCI state identification, a smaller control resource set (CORESET) identification, or a smaller search space identification; and determine the second beam failure detection reference signal resource set in accordance with setting the second beam failure detection reference signal resource set to include periodic CSI-RS resource configuration indexes having values the same as values of reference signal indexes in the second reference signal set indicated by the second TCI state of the at least two TCI states.

9. The apparatus of claim 1, wherein the processing system is further configured to:

detect a radio link failure in accordance with monitoring at least the first beam failure detection reference signal resource set; and wherein the apparatus further comprises:

a first interface is configured to output an indication of the radio link failure for transmission to a base station.

10. The apparatus of claim 1, wherein the processing system configured to monitor the PDCCH transmission further configures the processing system to:

monitor at least one control resource set (CORESET) associated with the at least two TCI states, monitoring one search space set associated with at least two CORESETs, or monitoring two search space sets associated with two CORESETs each having an active TCI state.

11. A method for wireless communication at a user equipment (UE), comprising:

monitoring a physical downlink control channel (PDCCH) transmission using at least two transmission control indicator (TCI) states; and monitoring a first beam failure detection reference signal resource set associated with the PDCCH monitoring for a beam failure, the first beam failure detection reference signal resource set being determined using one or more of the at least two TCI states, wherein the first beam failure detection reference signal resource set comprises one or more first reference signal indexes of a first reference signal set associated with a first TCI state of the at least two TCI states and comprises one or more second reference signal indexes of a second reference signal set associated with a second TCI state of the at least two TCI states.

12. The method of claim 11, wherein a characteristic of the one or more of the at least two TCI states is an order of the at least two TCI states that is identified in accordance with monitoring the PDCCH using the at least two TCI states, and wherein determining the first beam failure detection reference signal resource set further comprises:

setting the first beam failure detection reference signal resource set to include periodic channel state information reference signal (CSI-RS) resource configuration indexes having values the same as values of reference signal indexes in the first reference signal set indicated as the first TCI state by the order of the at least two TCI states.

13. The method of claim 11, wherein a characteristic of the one or more of the at least two TCI states is an identification that is identified in accordance with monitoring the PDCCH using the at least two TCI states, and wherein determining the first beam failure detection reference signal resource set further comprises:

selecting the first TCI state of the at least two TCI states in accordance with the identification; and setting the first beam failure detection reference signal resource set to include periodic channel state information reference signal (CSI-RS) resource configuration indexes having values the same as values of reference signal indexes in the first reference signal set indicated by the first TCI state.

14. The method of claim 13, wherein the identification includes one of a TCI state identification, a control resource set (CORESET) identification, or a search space identification.

15. The method of claim 13, wherein:

selecting the first TCI state is in accordance with a smallest identification of the at least two TCI states.

16. The method of claim 11, further comprising:

determining a second beam failure detection reference signal resource set associated with the PDCCH monitoring.

17. The method of claim 16, wherein:

determining the first beam failure detection reference signal resource set further comprises setting the first beam failure detection reference signal resource set to include periodic channel state information reference signal (CSI-RS) resource configuration indexes having values the same as values of reference signal indexes in the first reference signal set indicated by the first TCI state of the at least two TCI states; and determining the second beam failure detection reference signal resource set further comprises setting the second beam failure detection reference signal resource set to include periodic CSI-RS resource configuration indexes having values the same as values of reference signal indexes in the second reference signal set indicated by the second TCI state of the at least two TCI states.

18. The method of claim 16, wherein:

determining the first beam failure detection reference signal resource set further comprises setting the first beam failure detection reference signal resource set to include periodic channel state information reference signal (CSI-RS) resource configuration indexes having values the same as values of reference signal indexes in the first reference signal set indicated by the first TCI state of the at least two TCI states associated with a smaller transmit/reception point (TRP) identification, a smaller TCI state identification, a smaller control resource set (CORESET) identification, or a smaller search space identification; and determining the second beam failure detection reference signal resource set further comprises setting the second beam failure detection reference signal resource set to include periodic CSI-RS resource configuration indexes having values the same as values of reference signal indexes in the second reference signal set indicated by the second TCI state of the at least two TCI states.

19. The method of claim 11, further comprising:

detecting a radio link failure is in accordance with monitoring at least the first beam failure detection reference signal resource set; and sending an indication of the radio link failure to a base station.

20. The method of claim 11, wherein monitoring the PDCCH transmission further comprises:

monitoring at least one control resource set (CORESET) associated with the at least two TCI states, monitoring one search space set associated with at least two CORESETs, or monitoring two search space sets associated with two CORESETs each having an active TCI state.

21. A user equipment (UE) for wireless communications, comprising:

means for monitoring a physical downlink control channel (PDCCH) transmission using at least two transmission control indicator (TCI) states; and means for monitoring a first beam failure detection reference signal resource set associated with the PDCCH monitoring for a beam failure, the first beam failure detection reference signal resource set being determined using one or more of the at least two TCI states, wherein the first beam failure detection reference signal resource set comprises one or more first reference signal indexes of a first reference signal set associated with a first TCI state of the at least two TCI states and comprises one or more second reference signal indexes of a second reference signal set associated with a second TCI state of the at least two TCI states.

* * * * *